United States Patent

Tallant, II

[11] 4,450,476
[45] May 22, 1984

[54] DELAYED REACTION AUTOMATIC KINESCOPE BIASING SYSTEM

[75] Inventor: James C. Tallant, II, Indianapolis, Ind.

[73] Assignee: RCA Corporation, New York, N.Y.

[21] Appl. No.: 391,416

[22] Filed: Jun. 23, 1982

[51] Int. Cl.³ .................. H04N 5/68; H04N 9/20
[52] U.S. Cl. ........................ 358/74; 358/65; 358/243
[58] Field of Search .......... 358/242, 243, 65, 29, 358/74, 34, 168

[56] References Cited

U.S. PATENT DOCUMENTS

| 3,924,067 | 12/1975 | Arneson | 358/243 |
| 4,110,693 | 8/1978 | Evans | 325/419 |
| 4,263,622 | 4/1981 | Hinn | 358/242 |

OTHER PUBLICATIONS

Schematic Circuit Diagram of SABA/Nordmende European Color Television Receiver.

*Primary Examiner*—John C. Martin
*Assistant Examiner*—Luan Nguyen
*Attorney, Agent, or Firm*—Eugene M. Whitacre; Paul J. Rasmussen; Ronald H. Kurdyla

[57] ABSTRACT

An automatic kinescope bias (AKB) control system for a television receiver operates in response to an enabling timing signal for maintaining a desired level of kinescope blanking current. The timing signal is applied to a control input of the AKB system via a timing signal coupling path. The timing signal input to the AKB system is inhibited for a given time interval after the receiver is initially energized, to delay AKB action until the kinescope has reached a desired operating temperature. The timing signal is inhibited by means of a control network coupled to the timing signal path. The given time interval is determined by a time constant circuit which is associated with the control network and which is substantially insensitive to the amplitude, and duty cycle of the timing signal.

8 Claims, 4 Drawing Figures

DELAYED REACTION AUTOMATIC KINESCOPE BIASING SYSTEM

This invention concerns a television receiver, or equivalent video signal processing and image reproducing system, which includes a network for automatically controlling the bias of an associated image reproducing kinescope. In particular, this invention concerns such a system wherein the operation of the automatic control network is inhibited for a given interval after the receiver is initially energized.

Television receivers sometimes employ an automatic kinescope bias (AKB) control system for automatically establishing the proper blanking current levels for each electron gun of the kinescope. As a result of this operation, reproduced picture colors and gray scale tracking of the kinescope are prevented from being adversely affected by variations of kinescope bias from a desired level (e.g., due to aging and temperature effects). One type of AKB system is disclosed in U.S. Pat. 4,263,622 of Werner Hinn, titled "Automatic Kinescope Biasing System".

An AKB system typically operates during image retrace blanking intervals, at which time the kinescope conducts a small black level representative blanking current. The kinescope blanking current is monitored by the AKB system to generate a correction voltage representative of the difference between the sensed blanking current level and a desired current level. The correction voltage is applied to video signal processing circuits preceding the kinescope with a sense for reducing the difference.

The beam current conducted by the kinescope is approximately equal to the sum of the cathode currents conducted by each of the kinescope electron guns. When a television receiver is initially energized, the kinescope cathodes are cold and consequently conduct very little or no cathode current. This initial current is less than the desired blanking current. The AKB system senses this initial condition, and quickly adjusts the cathode bias in an attempt to produce the desired level of cathode blanking current (i.e., the AKB system attempts to force the cathode current to increase to the desired level by lowering the cathode bias voltage). The electron guns warm up to a normal operating temperature a few seconds after the receiver is initially energized. This time interval varies from one kinescope type to another, but is typically on the order of about ten seconds. At the end of this warm-up time, the kinescope electron guns come into conduction rapidly, causing a disturbingly bright image to be displayed on the kinescope screen with attendant image distortion (i.e., image blooming) due to the abnormally high levels of kinescope beam current produced because of initial AKB action. The abnormally high levels of beam current persist for approximately two seconds or until the AKB system is able to readjust the cathode bias and cathode current to a proper level. The high levels of beam current (e.g., on the order of four milliamperes) which can be produced before the AKB can readjust the cathode bias are potentially hazardous and can result in damaging stress to the kinescope and associated circuits. Conventional automatic beam current limiter circuits which are included in many television receivers cannot prevent the described undesirable transient effect since such beam limiter circuits typically limit beam current by operating on the video signal and exhibit an operating delay.

It is known that the desired unwanted transient effects caused by AKB action before the kinescope electron guns reach normal operating temperature can be prevented by delaying the initial operation of the AKB system for a time sufficient to allow the electron guns to reach proper operating temperature. One approach to accomplishing this result involves delaying the application of the timing signals which enable the AKB system to operate. This technique is advantageous in a system wherein, as is typically the case, separate AKB control circuits are respectively associated with each of the three kinescope cathode circuits and are timed to operate in response to a common AKB timing signal. Thus inhibiting the common timing signal delays the initial operation of all three AKB control circuits. A convenient point for accessing the timing signal to inhibit it during the initial AKB interval is along the coupling path which connects the timing signal source to the AKB system, since this connecting path is often readily accessible in the receiver.

In accordance with the present invention, there is disclosed herein a "hold-off" control network which is coupled to the AKB timing signal path for inhibiting the AKB timing signal for a prescribed interval after the receiver is initially energized. The hold-off network includes a timing network which establishes the prescribed hold-off interval, and which is advantageous insensitive to the amplitude and duty cycle of the AKB timing signal. These parameters of the AKB timing signal can vary from one receiver design to another depending on the requirements of the AKB system in a given receiver design, among other factors. The disclosed timing circuit can be used with a variety of receiver AKB system designs, without modification to compensate for differences in the parameters of the AKB timing signal.

Figure 1:
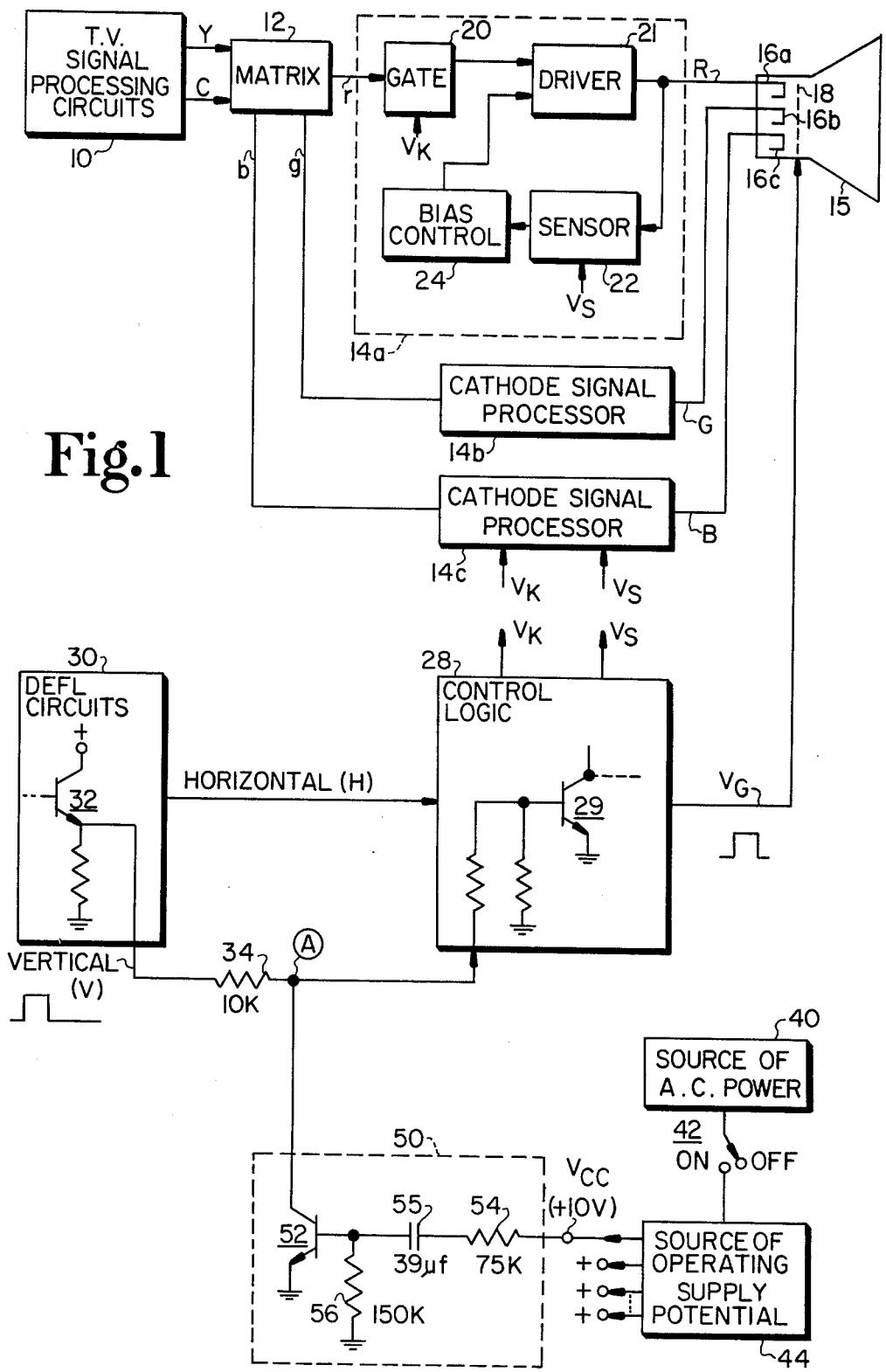
FIG. 1 shows a portion of a color television receiver, partially in block diagram form and partly in schematic circuit diagram form, including an AKB system and an associated timing control network according to the invention.

In FIG. 1, television signal processing circuits 10 provide separated luminance (Y) and chrominance (C) components of a composite color television signal to a matrix amplifier 12. Matrix 12 provides output low level color image representative signals r, g and b. These signals are amplified and otherwise processed by circuits within cathode signal processing networks 14a, 14b and 14c, respectively, which supply high level amplified color image signals R, G and B to respective cathode intensity control electrodes 16a, 16b and 16c of a color kinescope 15. In this example, kinescope 15 is of the self-converging in-line gun type with a commonly energized grid 18 associated with each of the electron guns comprising cathode electrodes 16a, 16b and 16c.

Cathode signal processors 14a, 14b and 14c are similar in this embodiment. Therefore, the following discussion of the operation of processor 14a also applies to processors 14b and 14c.

In network 14a, a keyed gate 20 (e.g., an electronic switch) couples and decouples the r signal output from matrix 12 to a video signal input of a DC coupled kinescope driver 21 in response to a keying signal $V_K$. Driver stage 21 includes a signal amplification network for developing high level output color signal R which is DC coupled to kinescope cathode 16a. Cathode 16a is coupled to an input of a voltage sensor 22, which is keyed by sampling signals $V_S$. Output signals from sensor 22 are supplied to a bias control stage 24, which produces an output bias control signal in response to signals received from sensor 22. The control signal from unit 24 is supplied to a bias control input of driver 21 for modifying the bias of amplifier circuits within driver 21, and thereby modifying the bias of cathode 16a, with a sense for controlling the blanking (black) level current conducted by cathode 16a, as will be discussed.

A control logic unit 28 responds to a horizontal synchronizing rate signal (H) and to a vertical synchronizing rate signal (V) derived from deflection circuits 30 of the receiver, for producing timing control signals $V_G$, $V_K$ and $V_S$ for controlling the operation of the AKB system. Keying signal $V_K$ encompasses the AKB monitoring interval, and kinescope grid drive signal $V_G$ and sampling signal $V_S$ occur within the AKB monitoring interval. Vertical signal V is coupled from the low impedance output of an emitter follower transistor 32 in deflection unit 30, via a current limiting resistor 34, to an input signal inverting transistor 29 included in control logic unit 28. Referring for the moment to the waveforms of FIG. 2, vertical signal V comprises a positive pulse component with a negative going amplitude transition occurring at the end of the vertical image retrace interval which is within a vertical image blanking interval. Horizontal blanking pulses H occur during the vertical blanking interval. Keying signal $V_K$ occurs during the AKB monitoring interval, comprising two horizontal line intervals within the vertical blanking interval, and kinescope grid drive pulse $V_G$ occurs during a portion of the AKB monitoring interval.

Cathode signal processor 14a in conjunction with control logic unit 28 form an AKB system of the type described in detail in U.S. Pat. No. 4,263,622 of Werner Hinn, which discloses suitable circuits for gate 20, driver 21, sensor 22, bias control 24 and control logic unit 28.

The AKB system accomplishes kinescope cathode blanking current monitoring and control during each vertical blanking interval after the end of vertical retrace, but before the beginning of vertical field scanning (image trace). This time period encompasses horizontal line intervals during which picture information absent. Vertical signal V initiates AKB control action by enabling control logic unit 28 to generate timing signals $V_G$, $V_K$ and $V_S$ in response to the negative-going amplitude transition of the vertical pulse which occurs at the end of vertical retrace. Signals $V_G$, $V_K$ and $V_S$ are initiated and timed to occur in response to the negative-going amplitude transition of signal V at the end of vertical retrace.

In operation, gate 20 is opened (i.e., rendered non-conductive) in response to signal $V_K$ to inhibit conduction of red color signal r from matrix 12 to driver 21. Gate 20 maintains this condition over the entire AKB interval. At this time, the quiescent output level of driver 21, and thereby the bias of kinescope cathode 16a, is established at a fixed reference level determined by a biasing network within driver 21. Signals from matrix 12 could also be inhibited by other means, such as by applying an appropriate voltage to gain control inputs of T.V. signal processing circuits 10 for causing circuits 10 to exhibit substantially zero signal gain with respect to the luminance and chrominance signals. Also at this time, relatively low voltage pulse $V_G$ is supplied to kinescope grid 18 with a sense for forward biasing the kinescope electron guns.

A voltage proportional to the cathode currents conducted over the AKB monitoring interval is utilized to determine if the kinescope electron gun is conducting a desired blanking current. The kinescope functions as a cathode follower in response to grid pulse $V_G$, wherein a similarly phased version of grid pulse $V_G$ appears at the cathode electrode during the grid pulse interval. The amplitude of the cathode output pulse so developed is proportional to the level of cathode current conduction but is somewhat attenuated relative to grid pulse $V_G$.

Under conditions of excessively high or low cathode blanking current, a voltage representative of the level of cathode blanking current is applied to bias control stage 24 by sensor 22 in response to sampling signals $V_S$. An output control signal from bias control stage 24 is applied to a bias control input of driver 21 for modifying the DC (bias) operating point of driver 21 in a direction to develop a bias level at the output of driver 21 sufficient to produce the desired cathode blanking current level by closed loop action. For example, the output DC level of driver 21 is controlled in a less positive direction for biasing the kinescope cathode to conduct increased blanking current. Gate 20 returns to the closed (conductive) position at the end of AKB interval, thereby allowing color signals from matrix 20 to be coupled to driver 21.

The television receiver is energized in response to plural receiver operating supply voltages provided from a source of supply potential 44 when source 44 is energized from a source of A.C. power 40 when a viewer operated power switch 42 is placed in the "on" position. The operating voltages from source 44 include supply voltages for the signal processing circuits of the receiver, as well as operating voltages for kinescope 15 (e.g., including filament heater and very high anode voltages).

A timing signal control network 50 according to the present invention is coupled to the vertical timing signal path at a node A. When the receiver is initially energized, the kinescope cathodes are cold and consequently conduct very little or no cathode current. This initial current is less than the desired blanking current. In the absence of control network 50, the AKB system senses this initial condition, and quickly adjusts the cathode bias in an attempt to produce the desired level of cathode blanking current (i.e., the AKB system attempts to force the cathode current to increase to the desired level by lowering the cathode bias voltage). The electron guns warm up to a normal operating temperature a few seconds after the receiver is initially energized. This time interval varies from one kinescope type to another, but is typically on the order of about ten seconds. At this time (i.e., at the end of ten seconds), the kinescope electron guns come into conduction rapidly, causing a disturbingly bright image to be displayed on the kinescope screen with attendant image distortion (i.e., image blooming) due to the abnormally high levels of kinescope beam current which can be produced at this time. This undesirable transient effect is caused by the prior AKB action in reducing the cathode bias in an attempt to increase kinescope cathode blanking current before the kinescope reached normal operating temperature, and persists until the AKB system is able to readjust the cathode bias and cathode current to a proper level (e.g., for approximately two seconds). The high levels of beam current (e.g., on the order of four milliamperes) which can be produced before the AKB system can readjust the can be produced before cathode bias are potentially hazardous and can result in damaging stress to the kinescope and associated circuits.

This undesirable transient effect is prevented by control network 50 coupled to node A in the vertical timing signal path between deflection circuits 30 and AKB control logic unit 28. Network 50 serves to prevent timing control signal V from being applied to AKB control logic unit 28 for a given time interval after the receiver is initially energized. The duration of this time interval corresponds to the time required for the kinescope to reach normal operating temperature. Accordingly, the AKB system is prevented from operating when the kinescope has not reached normal operating temperature since vertical timing signal V, which enables AKB operation, is decoupled from the AKB system during the initial kinescope warm-up interval.

Although the receiver includes three AKB systems, each respectively associated with signal processors 14a, 14b and 14c, only one control network 50 is required since network 50 controls the AKB enabling timing signal (V) which is utilized by the common control logic unit 28 for all three AKB systems.

Network 50 comprises a threshold condition transistor 52 with a collector output coupled to node A in the vertical timing signal path, and a base input coupled to an RC time constant circuit including resistors 54, 56 and a capacitor 55. A source of positive DC voltage Vcc (+10 volts) coupled to resistor 54 of the time constant network is derived from operating voltage source 44.

When the receiver is de-energized (switch 42 in the OFF position), output voltages from source 44 are absent, capacitor 55 has no stored charge, and transistor 52 is non-conductive.

Voltage Vcc appears as a positive going step function when the receiver is initially energized as switch 42 is placed in the ON position. At this time the voltage across capacitor 52 is essentially zero volts since the voltage across a capacitor cannot be changed instantaneously, and a small voltage drop (approximately three volts) appears across resistor 54. The base voltage of transistor 52 increases in a positive direction towards a voltage level equal to Vcc (+10 volts) minus the sum of the voltage drops across resistor 54 (3.0 volts) and capacitor 55 (0 volts). Before this voltage level is reached, the base-emitter junction of transistor 52 becomes forward biased, causing transistor 52 to conduct heavily in a saturated state. At this time the negative plate of capacitor 55 is clamped to the +0.7 volt base-emitter junction voltage of transistor 52, and the collector potential of transistor 52 closely approximates the emitter ground potential (zero volts) of transistor 52. Thus when the receiver is initially energized the rapid conduction of transistor 52 quickly clamps node A in the vertical timing signal path to a low voltage approximating zero volts. Accordingly, timing signal V is prevented from reaching control logic unit 28 and the operation of the AKB system is inhibited while transistor 52 remains conductive.

After the time of initial receiver energization, the charge on the positive plate of capacitor 55 and thereby the voltage drop across capacitor 55 increase with a charging time constant determined by the values of resistor 54 and capacitor 55. The increasing voltage across capacitor 55 produces a corresponding decrease in the base and collector currents of transistor 52. Approximately ten seconds after the receiver was first energized, the voltage across capacitor 55 is such that transistor 52 is rendered non-conductive, at which time timing signal V is enabled to reach control logic unit, 28 for initiating AKB action.

Resistor 56 acts as a bleeder resistor for conducting to ground any leakage current of capacitor 55 which would otherwise supply base current for maintaining transistor 52 conductive (and inhibiting AKB action) longer than intended. Resistor 56 also comprises a time constant network together with resistor 54 and capacitor 55 for causing capacitor 55 to discharge at a given rate when the receiver is de-energized. This time constant is such that, if the receiver is energized soon (e.g., a few seconds) after being de-energized, capacitor 55 will have only partially discharged, thereby producing an AKB hold-off interval of less than the full ten second interval. The full hold-off interval is not required in this instance since the kinescope electron guns remain warm. Resistor 56 also assists to achieve rapid turn-off of transistor 52 at the end of the AKB hold-off interval.

Figure 3:
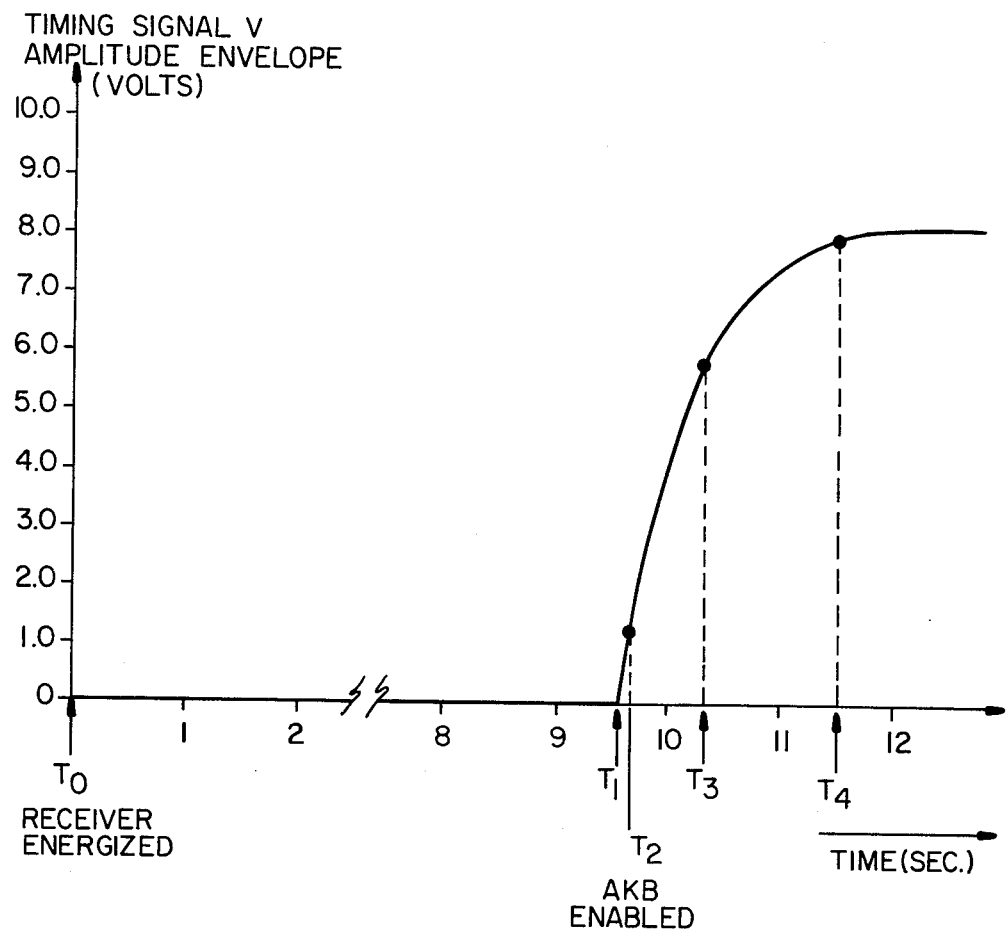
FIG. 3 shows the amplitude versus time response of the AKB timing signal in response to the action of the control network.

FIG. 3 illustrates the effect of control network 50 upon AKB timing signal V. The waveform of FIG. 3 represents the amplitude envelope of the pulses comprising time signal V (i.e., the signal response at node A in the time signal coupling path shown in FIG. 1). Timing signal V is blocked from the time the receiver is first energized, $T_0$, to a subsequent time $T_1$ approximately 9.7 seconds later, when transistor 52 begins to exhibit decreasing conduction (i.e., a non-saturated condition). Between times $T_0$ and $T_1$ node A is clamped to approximately ground potential (zero volts) via the collector of transistor 52. The conduction of transistor 52 continues to decline from time $T_1$ to time $T_4$, when transistor 52 is non-conductive.

At time $T_2$, shortly after time $T_1$, the conduction of transistor 52 has decreased by an amount sufficient to permit timing pulses V with an amplitude of +1.2 volts to appear at the input of control logic unit 28, thereby enabling AKB operation. At time $T_4$ transistor 52 is non-conductive and full amplitude (8 volt) timing pulses appear at the input of unit 28.

In this arrangement the AKB system is timed to begin operation in response to a "low" logic level applied to the vertical timing signal input of unit 28. Thus AKB system operation begins when the lagging, negative-going amplitude transition of signal V exhibits a +1.2 volt triggering level at the end of the vertical retrace interval, after being enabled by network 50. In this case signal V exhibits a positive duty cycle of 0.03 (i.e., 0.5 ms/17.18 ms). Other systems may be timed to begin operation in response to a "high" logic level applied to the vertical timing signal input of unit 28, depending on the input requirements of unit 28. This can be accomplished, for example, in response to a vertical timing signal V' as shown in FIG. 4 with a relatively more positive triggering level of 6.0 volts, and having a positive duty cycle of 0.97 (i.e., 16.68 ms/17.18 ms).

Figure 2:
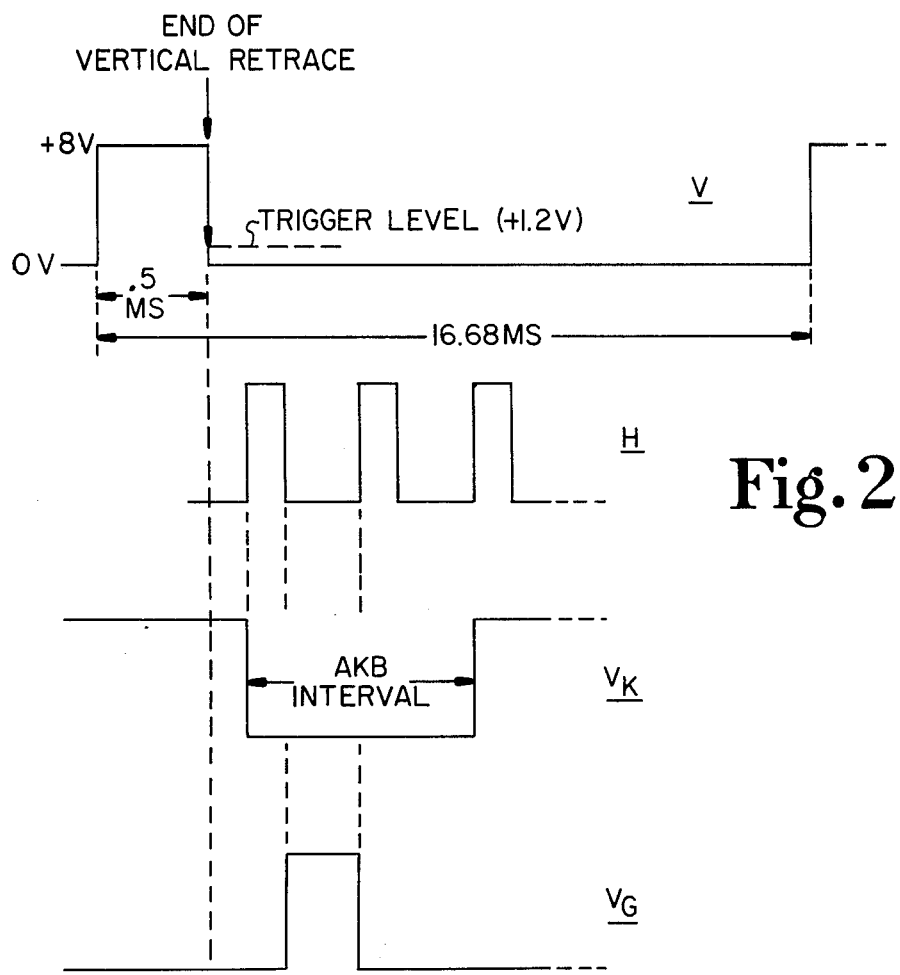
FIG. 2 illustrates AKB timing waveforms helpful in understanding the operation of the system of FIG. 1.
Figure 4:
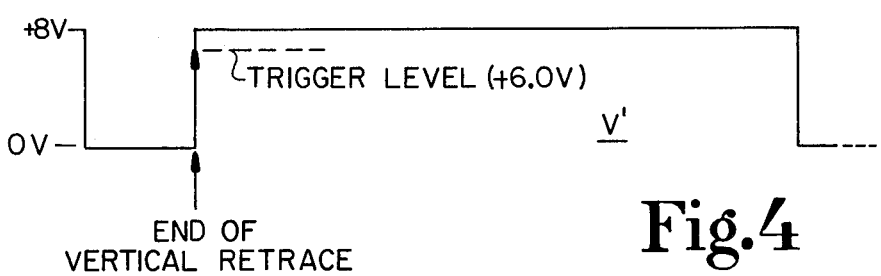
FIG. 4 shows an alternative version of an AKB timing signal waveform shown in FIG. 2.

Considering the response shown by FIG. 3 with regard to waveform V' shown in FIG. 4, it is noted that with waveform V' the "high" logic triggering level of +6.0 volts occurs at time T$_3$ (approximately 10.4 seconds) with network 50, compared to a "low" logic triggering level of +1.2 volts occurring at time T$_2$ (approximately 9.7 seconds) with respect to signal waveform V. The AKB hold-off intervals differ by only 0.7 seconds with respect to a system which employs a "low" logic triggering level (+1.2 volts) as in the case of signal waveform V of FIG. 2, compared to a system which employs a "high" logic triggering level (+6.0 volts) as in the case of signal waveform V' of FIG. 4. The fast response time of transistor 52 enables network 50 to be used with receivers employing either low or high logic trigger levels with subsantially equal effectiveness, since both result in an AKB hold-off interval of approximately ten seconds.

Thus the time constant circuit comprising resistor 54 and capacitor 55 can remain unchanged for receivers employing either high or low logic triggering levels. In this regard it is noted that a less than 7% change in the value of the time constant provided by resistor 54 and capacitor 55 would cause a high logic triggering level (+6 volts) to occur at time T$_2$ rather than at time T$_3$. However, such a change would be impractical and unnecessary in systems wherein such 7% change is within the tolerance of the value of capacitor 55, which often would be ±10%.

It is also noted that the time constant circuit comprising resistor 54 and capacitor 55 is not influenced by the amplitude or the duty cycle of AKB timing signal V. The amplitude of signal V may vary due to temperature effects and as a function of the tolerances of circuit elements associated with deflection network 30, for example. The duty cycle of the timing signal may vary from one receiver design to another, depending on the requirements of a given receiver design, and depending upon the polarity of the timing signal (e.g., compare the positive duty cycle of timing signal V in FIG. 2 with that of timing signal V' in FIG. 4).

Thus timing control network 50 is widely adaptable to a variety of receiver designs. For a given AKB hold-off interval, circuit 50 can be used without modification with respect to AKB timing signals of various amplitudes and duty cycles.

What is claimed is:

1. In a video signal processing system including a kinescope for displaying an image in response to image representative video signals applied thereto said kinescope exhibiting an initial conduction characteristic during an initial interval commencing when said system is initially energized, and exhibiting a normal conduction characteristic afterwards; means for supplying system operating voltages when said system is energized; and bias control means coupled to said kinescope and operative in response to a timing signal supplied thereto via a timing signal coupling path, for automatically controlling the bias of said kinescope; apparatus comprising:

timing control means for inhibiting said timing signal during said initial interval so that said bias control means is rendered inoperative for the duration of said initial interval, said timing control means comprising a time constant network coupled to said operating voltage supplying means; and a threshold conduction network with an input coupled to said time constant network and an output coupled to said timing signal path, said threshold network exhibiting first and second conductive states in response to bias provided from said time constant network substantially independent of the amplitude and duty cycle of said timing signal; wherein said threshold network exhibits (a) said first conductive state during said timing signal in said signal path, and (b) said second conductive state at the end of said initial interval for then enabling said timing signal in said signal path.

2. Apparatus according to claim 1, wherein said system comprises a television receiver for processing video signals comprising image display and image blanking intervals;

said timing signal is in synchronism with vertical image blanking intervals of said video signal; and said control means operates in response to said timing signals during said vertical blanking intervals for maintaining a desired level of kinescope blanking current; and said threshold network maintains a substantially fixed potential on said timing signal path, to the exclusion of said timing signal, during said initial interval.

3. Apparatus according to claim 1, wherein said threshold conduction network comprises an active current conducting device with an input electrode, and output and common electrodes defining a main current conduction path of said active device between said timing signal path and a re-ference potential; and said time constant network is coupled to said input of said active device.

4. Apparatus according to claim 3, wherein said active device corresponds to a transistor with a base input electrode coupled to said time constant network, a collector output electrode coupled to said timing signal path, and a common emitter electrode coupled to a reference potential.

5. Apparatus according to claim 4, wherein said time constant network comprises a resistor and a capacitor coupled in series between a source of DC voltage and said base input of said transistor.

6. Apparatus according to claim 5, and further comprising an impedance DC coupled from said base electrode of said transistor to a reference potential.

7. Apparatus according to claim 4, wherein said transistor exhibits a saturated conductive state during said initial interval.

8. In a color television receiver for processing color image representative video signals having image display and blanking intervals, said receiver including an image reproducing kinescope with plural intensity control electron guns each having associated cathode and grid electrodes, said kinescope exhibiting an initial conduction characteristic during an initial interval commencing when said receiver is initially energized, and exhibiting a normal conduction characteristic afterwards; means for supplying receiver operating voltages when said receiver is energized; plural bias control means respectively coupled to said kinescope electron guns and operative in response to a timing signal supplied thereto for automatically controlling the bias of said kinescope; and means for supplying a timing signal in common to said plural control means via a timing signal coupling path; apparatus comprising:

timing control means for inhibiting said timing signal during said initial interval so that said plural bias control means are rendered inoperative for the duration of said initial interval, said timing control means comprising a time constant network coupled to said operating voltage supplying means; and a threshold conduction network with an input coupled to said time constant network and an output coupled to said timing signal path, said threshold network exhibiting first and second conductive states in response to bias provided from said time constant network substantially independent of the amplitude and duty cycle of said timing signal; wherein said threshold network exhibits (a) said first conductive state during said initial interval for then inhibiting said timing signal in said signal path, and (b) said second conductive state at the end of said initial interval for then enabling said timing signal in said signal path.

* * * * *